(12) United States Patent
Hayes et al.

(10) Patent No.: US 8,592,040 B2
(45) Date of Patent: Nov. 26, 2013

(54) POLYMER EMULSION COATING OR BINDING FORMULATIONS AND METHODS OF MAKING AND USING SAME

(75) Inventors: Peter C. Hayes, Charlotte, NC (US); Ronald Horwitz, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 534 days.

(21) Appl. No.: 12/205,177

(22) Filed: Sep. 5, 2008

(65) Prior Publication Data

US 2010/0062264 A1    Mar. 11, 2010

(51) Int. Cl.
 B32B 17/06   (2006.01)
 B32B 37/00   (2006.01)
 C08L 37/00   (2006.01)
 C08L 33/08   (2006.01)

(52) U.S. Cl.
 USPC .......... 428/432; 428/703; 524/517; 524/521; 524/522; 524/531; 156/44

(58) Field of Classification Search
 None
 See application file for complete search history.

(56) References Cited

U.S. PATENT DOCUMENTS

| | | | |
|---|---|---|---|
| 3,607,486 A | 9/1971 | Jacks et al. | |
| 4,011,388 A * | 3/1977 | Murphy et al. | 526/320 |
| 4,611,087 A | 9/1986 | Yamashita et al. | |
| 4,686,254 A | 8/1987 | Lochhead et al. | |
| 4,814,514 A | 3/1989 | Yokota et al. | |
| 4,939,283 A | 7/1990 | Yokota et al. | |
| 4,943,612 A | 7/1990 | Morita et al. | |
| 4,952,650 A | 8/1990 | Young et al. | |
| 5,133,898 A | 7/1992 | Fock et al. | |
| 5,168,087 A | 12/1992 | Li Bassi et al. | |
| 5,268,437 A | 12/1993 | Holy et al. | |
| 5,273,676 A | 12/1993 | Boeckh et al. | |
| 5,275,650 A | 1/1994 | Mongoin et al. | |
| 5,332,854 A | 7/1994 | Yokota et al. | |
| 5,338,485 A | 8/1994 | Fock et al. | |
| 5,389,722 A | 2/1995 | Nagasuna et al. | |
| 5,506,325 A | 4/1996 | Swarup et al. | |
| 5,534,577 A | 7/1996 | Namba et al. | |
| 5,637,142 A | 6/1997 | Kubo et al. | |
| 5,661,206 A | 8/1997 | Tanaka et al. | |
| 5,679,835 A * | 10/1997 | Inden et al. | 560/222 |
| 5,707,445 A | 1/1998 | Yamato et al. | |
| 5,721,330 A | 2/1998 | Ma | |
| 5,726,268 A | 3/1998 | Sakamoto | |
| 5,911,820 A | 6/1999 | Satoh et al. | |
| 5,925,184 A | 7/1999 | Hirata et al. | |
| 5,977,242 A | 11/1999 | Origuchi et al. | |
| 6,048,953 A | 4/2000 | Kawashima et al. | |
| 6,087,418 A | 7/2000 | Yamashita et al. | |
| 6,103,788 A * | 8/2000 | Harui et al. | 523/403 |
| 6,140,435 A | 10/2000 | Zanotti-Russo | |
| 6,156,860 A | 12/2000 | Tanaka et al. | |
| 6,166,112 A | 12/2000 | Hirata et al. | |
| 6,174,980 B1 | 1/2001 | Hirata et al. | |
| 6,187,841 B1 | 2/2001 | Tanaka et al. | |
| 6,201,089 B1 | 3/2001 | Carter | |
| 6,214,958 B1 | 4/2001 | Le-Khac et al. | |
| 6,225,389 B1 | 5/2001 | Saint Victor | |
| 6,239,241 B1 | 5/2001 | Yamato et al. | |
| 6,258,162 B1 | 7/2001 | Kawakami et al. | |
| 6,264,739 B1 | 7/2001 | Yamato et al. | |
| 6,265,495 B1 | 7/2001 | Hirata et al. | |
| 6,271,326 B1 | 8/2001 | Nishikawa et al. | |
| 6,294,015 B1 | 9/2001 | Yamashita et al. | |
| 6,313,244 B1 | 11/2001 | Tanaka et al. | |
| 6,326,446 B2 | 12/2001 | Carter | |
| 6,376,581 B1 | 4/2002 | Tanaka et al. | |
| 6,384,168 B1 | 5/2002 | Tanaka et al. | |
| 6,388,038 B1 | 5/2002 | Hirata et al. | |
| 6,462,110 B2 | 10/2002 | Satoh et al. | |
| 6,506,837 B2 | 1/2003 | Destarac et al. | |
| 6,524,679 B2 | 2/2003 | Hauber et al. | |
| 6,527,850 B2 | 3/2003 | Schwartz et al. | |
| 6,534,590 B1 | 3/2003 | Aso et al. | |
| 6,534,597 B2 | 3/2003 | Adam et al. | |
| 6,538,047 B1 | 3/2003 | Miyabayashi | |
| 6,545,083 B1 | 4/2003 | Hirata et al. | |
| 6,555,641 B2 | 4/2003 | Parker et al. | |
| 6,569,234 B2 | 5/2003 | Yamashita et al. | |
| 6,569,976 B2 | 5/2003 | Baxter et al. | |
| 6,593,412 B1 * | 7/2003 | Rabasco et al. | 524/459 |
| 6,602,949 B2 | 8/2003 | Furukawa et al. | |
| 6,624,243 B2 * | 9/2003 | Stark et al. | 524/832 |
| 6,652,867 B1 | 11/2003 | Vincent et al. | |

(Continued)

FOREIGN PATENT DOCUMENTS

| | | |
|---|---|---|
| CA | 2180989 | 6/2003 |
| EP | 0 725 044 | 7/1996 |

(Continued)

OTHER PUBLICATIONS

Adeka, "New Reactive Surfactant: Adeka reasoap ER/SR Series,"Asahi Denka Co., Ltd., Jan. 29, 2003, 4 pp.
Adeka, "Adeka Reasoap Material Safety Data Sheet," Adeka Corp., Revised Sep. 10, 2006, 7 pp.
Mayer, H, "Masonry protection with silanes, siloxanes and silicone resins," Surface Coatings International, 1998, 5 pp.
Mizutani, Tsutomu et al, "Preparation of spherical nanocomposites consisting of silica core and polyacrylate shell by emulsion polymerization," Journal of Applied Polymer Science, 2006, 11pp.
NeoCAR Acrylics: The Next Step in Technology and Performance, Union Carbide, 1998, 16 pp.

(Continued)

Primary Examiner — David Sample
(74) Attorney, Agent, or Firm — Laura C. DiLorenzo

(57) ABSTRACT

Polymer emulsion formulations suitable for use as binders or in coating systems generally are provided. The formulations comprise a copolymer derived from one or more vinyl ester monomers of the formula I, one or more copolymerizable surfactants of formula II, and optionally one or more additional co-monomers. Gypsum boards, methods of making gypsum boards, and methods of making the copolymer are also disclosed.

26 Claims, No Drawings

(56) References Cited

U.S. PATENT DOCUMENTS

| | | |
|---|---|---|
| 6,656,266 B1 | 12/2003 | Barlet-Gouedard et al. |
| 6,673,885 B1 | 1/2004 | Shibata et al. |
| 6,713,553 B2 | 3/2004 | Gonnon et al. |
| 6,716,943 B2 | 4/2004 | Tanaka et al. |
| 6,723,786 B2 | 4/2004 | Husemann et al. |
| 6,723,813 B2 | 4/2004 | Asai et al. |
| 6,727,315 B2 | 4/2004 | Yamamoto et al. |
| 6,737,493 B2 | 5/2004 | Mochizuki et al. |
| 6,743,834 B2 | 6/2004 | Yokoyama et al. |
| 6,770,354 B2 | 8/2004 | Randall et al. |
| 6,815,513 B2 | 11/2004 | Le-Khac et al. |
| 6,841,655 B1 | 1/2005 | Gota et al. |
| 6,869,988 B2 | 3/2005 | Schwartz et al. |
| 6,878,321 B2 | 4/2005 | Hauber et al. |
| 6,900,275 B2 | 5/2005 | Tomita et al. |
| 6,905,814 B1 | 6/2005 | Aubay et al. |
| 6,919,388 B2 | 7/2005 | Nishikawa et al. |
| 6,921,801 B2 | 7/2005 | Collette et al. |
| 6,946,505 B2 | 9/2005 | Yuasa et al. |
| 6,960,624 B2 | 11/2005 | Gonnon et al. |
| 7,008,977 B2 | 3/2006 | Sakai et al. |
| 7,098,250 B2 | 8/2006 | Sawada et al. |
| 7,297,328 B2 | 11/2007 | Löffler et al. |
| 2002/0065208 A1 | 5/2002 | Aubay et al. |
| 2002/0103316 A1 | 8/2002 | Tanaka et al. |
| 2002/0123588 A1 | 9/2002 | Adam et al. |
| 2002/0157573 A1 | 10/2002 | Pellett |
| 2002/0168533 A1 | 11/2002 | Taylor et al. |
| 2003/0031719 A1 | 2/2003 | Kipp et al. |
| 2003/0162890 A1 | 8/2003 | Kalantar et al. |
| 2003/0212195 A1 | 11/2003 | Matsumoto et al. |
| 2004/0048963 A1 | 3/2004 | Sawada et al. |
| 2004/0052746 A1* | 3/2004 | Tamareselvy et al. ..... 424/70.11 |
| 2004/0054111 A1 | 3/2004 | Kalantar et al. |
| 2004/0075074 A1 | 4/2004 | Kubota et al. |
| 2004/0109836 A1 | 6/2004 | Loffler et al. |
| 2004/0127607 A1 | 7/2004 | Schober et al. |
| 2004/0152379 A1 | 8/2004 | McLarty, III et al. |
| 2004/0170873 A1 | 9/2004 | Smith |
| 2004/0185231 A1 | 9/2004 | Dimmick |
| 2004/0209074 A1 | 10/2004 | Randall et al. |
| 2004/0235687 A1 | 11/2004 | Shibai et al. |
| 2004/0242760 A1 | 12/2004 | Shibai et al. |
| 2005/0075416 A1 | 4/2005 | Miyabayashi |
| 2005/0202742 A1 | 9/2005 | Smith et al. |
| 2005/0202997 A1 | 9/2005 | Hanazawa et al. |
| 2005/0222301 A1 | 10/2005 | Yuasa et al. |
| 2005/0229519 A1 | 10/2005 | Colbert et al. |
| 2005/0250887 A1 | 11/2005 | Yang et al. |
| 2005/0266225 A1 | 12/2005 | Currier et al. |
| 2005/0266238 A1 | 12/2005 | Amano et al. |
| 2006/0024494 A1 | 2/2006 | Amano et al. |
| 2006/0035112 A1 | 2/2006 | Veeramosuneni et al. |
| 2006/0057371 A1 | 3/2006 | Kobayashi et al. |
| 2006/0115669 A1 | 6/2006 | Shinohara et al. |
| 2006/0178494 A1 | 8/2006 | Pabon et al. |
| 2006/0188714 A1 | 8/2006 | Tetsumoto et al. |
| 2006/0240236 A1 | 10/2006 | Bland et al. |
| 2006/0277854 A1 | 12/2006 | Egan |
| 2006/0278267 A1 | 12/2006 | Miyazawa |
| 2007/0012221 A1 | 1/2007 | Maeta et al. |
| 2007/0123637 A1 | 5/2007 | Pernecker et al. |
| 2007/0135559 A1 | 6/2007 | Fukumon et al. |
| 2007/0287019 A1 | 12/2007 | Chen et al. |
| 2008/0057346 A1 | 3/2008 | Peuramaki |
| 2008/0069793 A1 | 3/2008 | Loffler et al. |
| 2008/0245012 A1* | 10/2008 | Boisvert et al. ............. 52/408 |
| 2009/0043035 A1* | 2/2009 | Cabrera .................... 524/457 |

FOREIGN PATENT DOCUMENTS

| | | |
|---|---|---|
| EP | 1911808 | 4/2008 |
| GB | 1 242 290 | 8/1971 |
| GB | 2 264 114 | 8/1993 |
| GB | 2 319 522 | 5/1998 |
| JP | 59-203742 | 11/1984 |
| JP | 08-217505 | 8/1996 |
| JP | 03-218956 | 8/2001 |
| WO | WO 98/28240 | 7/1998 |
| WO | WO 00/22016 | 4/2000 |
| WO | WO 00/63294 | 10/2000 |
| WO | WO 02/12144 | 2/2002 |

OTHER PUBLICATIONS

Product Data Sheet, Veova™ Monomer 10, Resolution Performance Products, Re-issued Oct. 2002, 3 pp.

Product Bulletin W 1.2, VeoVa Monomers Applications and Advantages, Hexion Specialty Chemicals, 2006, 4 pp.

Hexion.com. VeoVa Vinyl Ester of Neodecanoic Acid, VeoVa Vinyl Esters, Hexion Specialty Chemicals, 2006, 1 pp.

International Preliminary Report on Patentability issued in related International Patent Application No. PCT/EP2009/060850, mailed Mar. 8, 2011.

Written Opinion issued in related International Patent Application No. PCT/EP2009/060850, mailed Feb. 24, 2010.

International Search Report issued in related International Patent Application No. PCT/EP2009/060850, mailed Feb. 24, 2010.

* cited by examiner

POLYMER EMULSION COATING OR BINDING FORMULATIONS AND METHODS OF MAKING AND USING SAME

TECHNICAL FIELD

This disclosure relates to polymer emulsion coatings or binding formulations and methods of using and making the same. For example, this disclosure relates to water and/or mold-resistant polymer emulsion coatings or binding formulations, methods for using such emulsions in architectural coatings such as gypsum board, and methods of making the same.

BACKGROUND

Gypsum board is widely used in both residential and commercial construction for interior walls and ceilings. One reason for this is that gypsum board is lighter than masonry or concrete walls and can eliminate the need for costly footers or foundation modifications. Gypsum board is also considered well-suited for construction requiring cost-effectiveness, fire resistance, and durability.

Gypsum board, however, has found limited utility for exterior applications due to concerns with weather resistance, for example, mold and moisture resistance. One kind of gypsum board has a sandwich construction of fiberglass facers and gypsum filling. Especially for demanding exterior construction applications, it would be preferable to apply a water-resistant coating on the top fiberglass facer.

SUMMARY

Polymer emulsion formulations suitable for use as binders or in coating systems generally are provided. The formulations comprise copolymers derived from one or more vinyl ester monomers of the formula I:

$$CH_2=CR_1-O-CO-R_2, \quad (I)$$

wherein $R_1$ is H or $CH_3$ and $R_2$ is $C_6$-$C_{12}$ branched or straight chain alkyl, one or more copolymerizable surfactants, and optionally one or more additional co-monomers. In some embodiments, the vinyl ester monomer includes a vinyl ester of neodecanoic acid. The one or more copolymerizable surfactants can be of formula II:

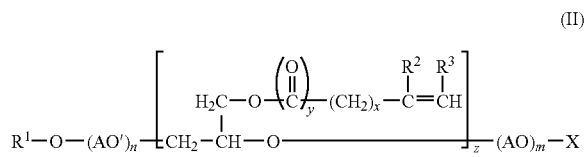

(II)

wherein $R^1$ represents a branched aliphatic hydrocarbon group, a secondary aliphatic hydrocarbon group or a branched aliphatic acyl group, AO and AO' each independently represents an oxyalkylene group having 2 to 4 carbon atoms, $R^2$ and $R^3$ each independently represents a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000.

In some embodiments, the copolymerizable surfactant can include at least one copolymerizable surfactant of formula IIa:

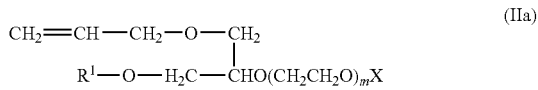

(IIa)

wherein $R^1$ is C9-C15 alkyl or C7-C11 alkyl-phenyl, X is H, $SO_3NH_4$ and/or $SO_3Na$, and m is 3 to 50. In some embodiments, $R^1$ is C10-C14 alkyl, X is H and/or $SO_3NH_4$, and m is 5 to 40.

Also provided are gypsum board materials coated with a polymer emulsion binder formulation in accordance with one of the embodiments described above. In some embodiments, the gypsum board materials have a scrim formed of fibers such as polyester or glass fibers, and at least a portion of one of the scrim is coated with a polymer emulsion binder formulation in accordance with one of the embodiments described above.

Also provided are methods of making the copolymers described above, comprising: reacting monomers with at least one copolymerizable surfactant of formula II, or salt thereof to form a copolymer, wherein the monomers include one or more vinyl ester monomers of the formula CH2=CR1-O—CO—R2, wherein R1 is H or CH3 and R2 is C6-C12 branched or straight chain alkyl, and optionally one or more co-monomers.

Also provided are methods of making binder or coating formulations comprising copolymers according to the present specification, comprising combining one or more copolymers according to the present specification with a dispersant. In some embodiments, the binder or coating formulations further comprise a pigment and/or a rheology modifier.

Also provided are methods of making a gypsum board, comprising coating at least a portion of a surface of a glass scrim with a formulation as described above, laying the glass scrim on wet gypsum to attach the glass scrim to the gypsum to form a glass-gypsum composite, and drying the glass-gypsum composite or allowing the glass-gypsum composite to dry.

The details of one or more embodiments are set forth in the description below. Other features, objects, and advantages will be apparent from the description and from the claims.

DETAILED DESCRIPTION

The term "including" and variations thereof means "comprising" and variations thereof. The term "including" and its variations are therefore open, non-limiting terms.

A coating or binding formulation comprises an emulsion copolymer dispersion in which the copolymer is derived from at least one copolymerizable surfactant and one or more vinyl ester monomers. The coating or binding formulations are useful in architectural coating applications, such as gypsum board coatings or paint. The coating or binding formulations can improve the weather resistance, for example the water and/or mold resistance, of the architectural applications. The coating or binding formulations are therefore also useful in other end applications, such as for coatings of cardboard boxes, in which weather resistance (or water and/or mold resistance) may be a benefit.

Vinyl ester monomers suitable for use the coating or binding formulations generally have the formula I:

$$CH2=CR1-O-CO-R2, \quad (I)$$ 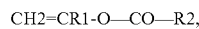

wherein R1 is H or CH3 and R2 is C6-C12, or for example C6-C10, branched or straight chain alkyl. In certain embodiments, the copolymer is derived from a vinyl ester of neodecanoic acid. Suitable vinyl esters of neodecanoic acid include VeoVa™ 10 (Hexion Specialty Chemicals, Columbus, Ohio), a synthetic saturated monocarboxylic acid with a highly branched structure containing ten carbon atoms. The amount of the vinyl ester monomer ranges from greater than 0 to about 100 phm in the final copolymer, for example the amount of the vinyl ester monomer can range from about 5 to about 60 phm, about 10 to about 60 phm, about 20 to about 55 phm, or about 30 to about 50 phm in the final copolymer.

Copolymerizable surfactants suitable for use in the coating or binding formulations have the formula II:

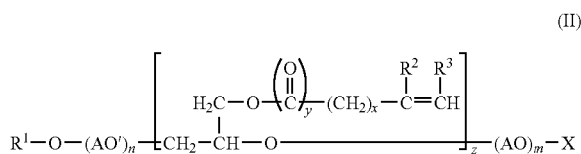

(II)

wherein $R^1$ represents a branched aliphatic hydrocarbon group, a secondary aliphatic hydrocarbon group or a branched aliphatic acyl group, AO and AO' each independently represents an oxyalkylene group having 2 to 4 carbon atoms, $R^2$ and $R^3$ each independently represents a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000. Suitable copolymerizable surfactants are described in U.S. Pat. No. 6,841,655, which is hereby incorporated by reference in its entirety.

In some embodiments, the copolymerizable surfactant can be provided according to Formula IIa:

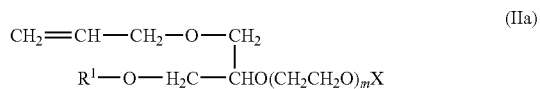

(IIa)

wherein $R^1$ is C9-C15 alkyl or C7-C11 alkyl-phenyl, X is H, $SO_3NH_4$ and/or $SO_3Na$, and m is 3 to 50. In some embodiments, R1 is C10-C14 alkyl, X is H and/or $SO_3NH_4$, and m is 5 to 40. In some embodiments, m is from 5 to 25, from 5 to 20 or from 5 to 15 (e.g. m=10). Exemplary compounds wherein $R^1$ is C10-C14 alkyl include ADEKA REASOAP series ER and SR surfactants (Asahi Denka Co., Ltd.), such as ER-10, ER-20, ER-30, ER-40, SR-10, SR-20, and SR-1025. For example, ADEKA REASOAP SR-10, which includes ammonium salts of poly(oxy-1,2-ethanediyl),alpha-sulfo-omega-[1-(hydroxymethyl)-2-(2-propenyloxy)ethoxy]-, C11-rich, C10-14-branched alkyl ethers, can be used. Exemplary compounds in which $R^1$ is C7-C11 alkyl-phenyl include ADEKA REASOAP series NE and SE surfactants, such as NE-10, NE-20, NE-30, NE-40, NE-50, SE-10N, SE-20N, and SE-1025N.

In some embodiments, the amount of copolymerizable surfactant monomers present in the copolymer ranges from about 0.5 to about 5, or about 1 to about 4, parts by weight per one hundred parts monomer ("phm").

In addition to the one or more vinyl esters and the one or more copolymerizable surfactants, the copolymer can further be derived from one or more co-monomers, such as for example: styrene, butadiene, vinyl acetate, carboxylic acids, (meth)acrylic acid esters, (meth)acrylamide, and (meth)acrylonitrile. The copolymer can be a pure acrylic-based copolymer, a styrene acrylic-based copolymer, a styrene butadiene-based copolymer, or a vinyl acrylic-based copolymer. Suitable unsaturated monomers for use in forming the copolymer are generally ethylenically unsaturated monomers and include vinylaromatic compounds (e.g. styrene, α-methylstyrene, o-chlorostyrene, and vinyltoluenes); 1,2-butadiene (i.e. butadiene); conjugated dienes (e.g. 1,3-butadiene and isoprene); α,β-monoethylenically unsaturated mono- and dicarboxylic acids or anhydrides thereof (e.g. acrylic acid, methacrylic acid, crotonic acid, dimethacrylic acid, ethylacrylic acid, allylacetic acid, vinylacetic acid maleic acid, fumaric acid, itaconic acid, mesaconic acid, methylenemalonic acid, citraconic acid, maleic anhydride, itaconic anhydride, and methylmalonic anhydride); esters of α,β-monoethylenically unsaturated mono- and dicarboxylic acids having 3 to 6 carbon atoms with alkanols having 1 to 12 carbon atoms (e.g. esters of acrylic acid, methacrylic acid, maleic acid, fumaric acid, or itaconic acid, with C1-C12, C1-C8, or C1-C4 alkanols such as ethyl, n-butyl, isobutyl and 2-ethylhexyl acrylates and methacrylates, dimethyl maleate and n-butyl maleate); acrylamides and alkyl-substituted acrylamides (e.g. (meth)acrylamide, N-tert-butylacrylamide, and N-methyl (meth)acrylamide); (meth)acrylonitrile; vinyl and vinylidene halides (e.g. vinyl chloride and vinylidene chloride); vinyl esters of C1-C18 mono- or dicarboxylic acids (e.g. vinyl acetate, vinyl propionate, vinyl n-butyrate, vinyl laurate and vinyl stearate); C1-C4 hydroxyalkyl esters of C3-C6 mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with C1-C18 alcohols alkoxylated with from 2 to 50 mol of ethylene oxide, propylene oxide, butylene oxide or mixtures thereof (e.g. hydroxyethyl(meth)acrylate, hydroxypropyl (meth)acrylate, and methylpolyglycol acrylate); and monomers containing glycidyl groups (e.g. glycidyl methacrylate).

Additional co-monomers that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g. methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino) ethyl vinyl ether, methyldiglycol vinyl ether, and the corresponding allyl ethers); sulfo-functional monomers (e.g. allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate and sulfopropyl methacrylate); vinylphosphonic acid, dimethyl vinylphosphonate, and other phosphorus monomers; alkylaminoalkyl(meth)acrylates or alkylaminoalkyl(meth)acrylamides or quaternization products thereof (e.g. 2-(N,N-dimethylamino)ethyl(meth)acrylate, 3-(N,N-dimethylamino) propyl(meth)acrylate, 2-(N,N,N-trimethylammonium)ethyl (meth)acrylate chloride, 2-dimethylaminoethyl(meth) acrylamide, 3-dimethylaminopropyl(meth)acrylamide, and 3-trimethylammoniumpropyl(meth)acrylamide chloride); allyl esters of C1-C30 monocarboxylic acids; N-Vinyl compounds (e.g. N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monomers containing 1,3-diketo groups (e.g. acetoacetoxyethyl(meth)acrylate or diacetonacrylamide; monomers containing urea groups (e.g. ureidoethyl (meth)acrylate, acrylamidoglycolic acid, and methacrylamidoglycolate methyl ether); and monomers containing silyl groups (e.g. trimethoxysilylpropyl methacrylate).

The co-monomers can also include one or more crosslinkers such as N-alkylolamides of $\alpha,\beta$-monoethylenically unsaturated carboxylic acids having 3 to 10 carbon atoms and esters thereof with alcohols having 1 to 4 carbon atoms (e.g. N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinking monomers include diesters of dihydric alcohols with $\alpha,\beta$-monoethylenically unsaturated monocarboxylic acids, of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate and methylenebisacrylamide. In some embodiments, the crosslinking monomers include alkylene glycol diacrylates and dimethacrylates, and/or divinylbenzene. The crosslinking monomers when used in the copolymer can be present in an amount of from 0.2% to 5% phm and are considered part of the total amount of co-monomers used in the copolymer.

In addition to the crosslinking monomers, small amounts (e.g. from 0.01 to 4 phm) of molecular weight regulators, such as tert-dodecyl mercaptan, can be used. Such substances are preferably added to the polymerization zone in a mixture with the monomers to be polymerized and are considered part of the total amount of unsaturated monomers used in the copolymer.

The copolymer can be derived from the one or more co-monomers in an amount of from greater than about 39.5 to less than about 89.5 phm, about 45 to about 80 phm, about 47.5 to about 72.5 phm, or about 50 to about 65 phm.

In some embodiments, the one or more co-monomers can include styrene, $\alpha$-methylstyrene, (meth)acrylic acid, itaconic acid, maleic acid, fumaric acid, crotonic acid, methyl (meth)acrylate, ethyl(meth)acrylate, n-butyl(meth)acrylate, isobutyl(meth)acrylate, tert-butyl(meth)acrylate, 2-ethylhexyl(meth)acrylate, vinyl acetate, butadiene, (meth)acrylamide, (meth)acrylonitrile, hydroxyethyl(meth)acrylate and glycidyl(meth)acrylate.

In some embodiments, the copolymer can be a styrene acrylic-based copolymer derived from monomers including styrene, (meth)acrylic acid, (meth)acrylic acid esters, (meth) acrylamide, (meth)acrylonitrile, and mixtures thereof. For example, the styrene acrylic copolymer can include styrene and at least one of (meth)acrylic acid, itaconic acid, methyl (meth)acrylate, ethyl(meth)acrylate, n-butyl(meth)acrylate, isobutyl(meth)acrylate, tert-butyl(meth)acrylate, 2-ethylhexyl(meth)acrylate, (meth)acrylamide, (meth)acrylonitrile, and hydroxyethyl(meth)acrylate. The styrene acrylic copolymer can include from 21 to 57 phm (meth)acrylates, from 16 to 51 phm of styrene, 5 to 60 phm of at least one vinyl ester of formula I (e.g. 10 to 30 phm), 0.5 to 5 phm of at least one copolymerizable surfactant of formula II, 0 to 2 phm of (meth)acrylamide, and 0 to 6 phm (meth)acrylonitrile. The styrene acrylic copolymer can also include from 0 to 3 phm of one or more crosslinking monomers as described above such as alkylene glycol diacrylates and dimethacrylates.

In some embodiments, the copolymer can be a styrene butadiene-based copolymer derived from monomers including styrene, butadiene, (meth)acrylamide, (meth)acrylonitrile, itaconic acid and (meth)acrylic acid. The styrene butadiene copolymer can include from 22 to 75 phm of styrene, from 13 to 50 phm of butadiene, 5 to 60 phm of at least one vinyl ester of formula I (e.g. 10 to 30 phm), 0.5 to 5 phm of at least one copolymerizable surfactant of formula II, 0 to 6 phm of itaconic and/or (meth)acrylic acid, 0 to 2 phm of (meth) acrylamide, and 0 to 15 phm (meth)acrylonitrile. The styrene butadiene copolymer can also include from 0 to 3 phm of one or more crosslinking monomers as described above such as divinylbenzene.

In some embodiments, the copolymer can be a vinyl acrylic-based copolymer derived from monomers including vinyl acetate, (meth)acrylic acid, (meth)acrylic acid esters, (meth)acrylamide, (meth)acrylonitrile, and mixtures thereof. For example, the vinyl acrylic copolymer can include vinyl acetate and at least one of (meth)acrylic acid, itaconic acid, methyl(meth)acrylate, ethyl(meth)acrylate, n-butyl(meth) acrylate, isobutyl(meth)acrylate, tert-butyl(meth)acrylate, 2-ethylhexyl(meth)acrylate, (meth)acrylamide, (meth)acrylonitrile, and hydroxyethyl(meth)acrylate. The vinyl acrylic copolymer can include from 21 to 57 phm (meth)acrylates, from 16 to 51 phm of vinyl acetate, 5 to 60 phm of at least one vinyl ester of formula I (e.g. 20 to 60 phm), 0.5 to 5 phm of at least one copolymerizable surfactant of formula II, 0 to 2 phm of (meth)acrylamide, and 0 to 6 phm (meth)acrylonitrile. The vinyl acrylic copolymer can also include from 0 to 3 phm of one or more crosslinking monomers as described above such as alkylene glycol diacrylates and dimethacrylates.

In some embodiments, the copolymer is a pure acrylic-based copolymer derived from one or more monomers chosen from (meth)acrylic acid, (meth)acrylic acid esters, (meth) acrylamide, and (meth)acrylonitrile. In some embodiments, the copolymer can include from 39 to 94 phm of at least one (meth)acrylic acid ester (e.g. 39 to 79 phm); 5 to 60 phm of at least one vinyl ester of formula I (e.g. 20 to 60 phm), 0.5 to 5 phm of at least one copolymerizable surfactant of formula II, 0 to 6 phm of itaconic acid and/or meth(acrylic) acid; 0 to 3 phm of at least one (meth)acrylamide, 0 to 10 phm of at least one (meth)acrylonitrile; and 0 to 5 phm of vinyl triethoxysilane.

In some embodiments, the copolymer is a copolymer of methyl methacrylate ("MMA"), 2-ethyl hexyl acrylate ("2 EHA"), a vinyl ester of formula I (e.g. the vinyl ester of neodecanoic acid), and at least one copolymerizable surfactant of formula II (e.g. the compound of formula II(a)). In some embodiments, the copolymer can include from 15 to 55 phm of at least one (meth)acrylic acid ester; 10 to 35 phm 2-EHA, 20 to 60 phm of at least one vinyl ester of formula I, 0.5 to 5 phm of at least one copolymerizable surfactant of formula II, 0.5 to 6 phm of itaconic and/or (meth)acrylic acid, 0 to 3 phm of at least one (meth)acrylamide, 0 to 10 phm of at least one (meth)acrylonitrile; and 0 to 5 phm of vinyl triethoxysilane.

The choice of monomers in addition to the vinyl esters and copolymerizable surfactants used in the copolymers can be driven by economic concerns, for example, to decrease the cost of producing the coating or binding formulations. The choice of monomers can also be driven by the characteristics of the monomers and the requirements the end application. With respect to exterior architectural applications such as gypsum board and paint, monomers may be chosen which are hydrophobic and consequently resist water, and/or which may be light resistant. In some embodiments, the monomers and the amounts that the monomers are used to form the copolymer is selected to provide a glass transition temperature ("Tg") of the polymer such that it falls within a useful range for a coating or binding composition. For example, the Tg of the final copolymer can be from about −10° C. to about 25° C.

In some embodiments, the emulsion polymer dispersion includes, as the disperse phase, particles of the (co)polymer dispersed in water. The emulsion polymer dispersion can include the (co)polymer in an amount of about 50% by weight, with the remainder being water. Alternatively, the amount of copolymer can range from 10% to 75% by weight, 15% to 65% by weight, or 40% to 60% by weight. The copolymer particles can have a median particle size of from about 80 nm to about 160 nm, or from about 90 nm to about 150 nm.

In some embodiments, the polymer emulsion is substantially free of non-copolymerizable surfactants. "Substantially free" means that to the extent the formulations contain non-copolymerizable surfactants, the amount does not reduce the water-resistance of the polymer emulsion formulations. For example, the emulsion can include less than 0.1 phm, less than 0.05 phm, or less than 0.01 phm of non-copolymerizable surfactants. In some embodiments, the polymer emulsion formulations are free of non-copolymerizable surfactants.

The coating or binder formulations can also include initiators, stabilizers, chain transfer agents, buffering agents, salts, preservatives, fire retardants, fillers, dyes, pigments, dispersants, thickeners (rheology modifiers), and/or other additives. In some embodiments, the emulsion polymer dispersion can be combined with pigments, dispersants, and rheology modifiers. Exemplary pigments include calcium carbonate such as DF 50 from Franklin Industrial Minerals and other minerals such as clay and titanium dioxide. Exemplary dispersants include sodium polyacrylates in aqueous solution such as those sold under the DARVAN trademark by R.T. Vanderbilt Co., Norwalk, Conn. Exemplary rheology modifiers or thickeners can include acrylic copolymer dispersions sold under the STEROCOLL and LATEKOLL trademark from BASF Corporation, Florham Park, N.J.

The emulsion copolymer dispersions can be prepared by polymerizing the monomers (including the copolymerizable surfactant) using free-radical aqueous emulsion polymerization. The emulsion polymerization temperature is generally from 30 to 95° C. or from 75 to 90° C. The polymerization medium can include water alone or a mixture of water and water-miscible liquids, such as methanol. In some embodiments, water is used alone. The emulsion polymerization can be carried out either as a batch, semi-batch or continuous process. Typically, a semi-batch process is used. In some embodiments, a portion of the monomers can be heated to the polymerization temperature and partially polymerized, and the remainder of the polymerization batch can be subsequently fed to the polymerization zone continuously, in steps or with superposition of a concentration gradient. In some embodiments, the copolymerizable surfactant to be used can be provided initially in the polymerization zone in dissolved form in an aqueous mixture.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates. In the combined systems, the carbohydrate derived compound can also be used as the reducing component. In general, the amount of free-radical initiator systems employed can be from 0.1 to 2 phm, based on the total amount of the monomers to be polymerized. In some embodiments, the initiators are ammonium and/or alkali metal peroxydisulfates (e.g. sodium peroxydisulfates), alone or as a constituent of combined systems. The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

The emulsion polymer dispersion can be used as a binder in any coating system, particularly where water resistance is beneficial. In some embodiments, the emulsion polymer dispersion is incorporated into a coating formulation for architectural applications. In some embodiments, the emulsion polymer dispersion is incorporated into a coating formulation for exterior architectural applications such as exterior paint and gypsum board sheathing. In some embodiments, the emulsion polymer dispersion is incorporated into a coating formulation for gypsum board.

In some embodiments, the emulsion polymer dispersion can impart one or more of weather resistance, water resistance, mold resistance, or low water absorption to the architectural applications or other end use applications having a coating comprising the dispersion as compared to the application absent the coating. In some embodiments, the emulsion polymer dispersion can provide improvements in rheology of binder or coating formulation. In some instances, the formulations have an absence of dilatency. In some embodiments, the formulations provide improved filler acceptance.

The emulsion copolymer can be formulated into a coating and applied to gypsum board by any known method in the art. In some embodiments, at least a portion of a glass scrim is coated with a coating formulation comprising the copolymer emulsion, the glass scrim is placed on wet gypsum to attach the glass scrim to the gypsum forming a glass-gypsum composite, and the glass-gypsum composite is then dried (e.g. through heating) or allowed to dry.

In some embodiments, gypsum board coated with a formulation comprising an emulsion polymer dispersion according to the present specification has a water absorptiveness using the Cobb test of about 60 $g/m^2$ or less, about 50 $g/m^2$ or less, about 40 $g/m^2$ or less. The Cobb test, according to TAPPI standard T441 om-98, 1998, is used to measure the water absorptiveness of gypsum board having a coating according to the present invention.

In some embodiments, gypsum board coated with a formulation comprising an emulsion polymer dispersion according to the present specification has an air permeance of from 500 to 2000. The air permeance is determined using the Gurley Air Permeance test, using TAPPI standard T 460 om-96, 1996.

EXAMPLES

Example 1

Comparative formulations 1-7 were made according to the following procedure: In a continuous feed process, a reactor was initially charged with water, a portion of the copolymerizable surfactant and a metal chelating agent, specifically a tetra sodium salt of ethylenediaminetetraacetic acid ("EDTA", Hampene). Additional water and a polymerization initiator, specifically sodium persulfate, were then added to the reactor as an initiator feed over a four and a half hour time period. After adding the initiator feed to the reactor, an aqueous feed comprised of water, the balance of the surfactant and acrylic acid, if present in the formulation, were added to the reactor over a four hour time period. Simultaneously, a monomer feed was added to the reactor comprising the other monomers which react to form the copolymer. After the initiator, aqueous, and monomer feed were charged to the reactor, i.e. after 4.5 hours, the contents were neutralized by addition of a base, specifically ammonium hydroxide over a period of fifteen minutes. Finally an oxidizer feed, specifically tert-butyl hydroperoxide ("TBHP") and a reducer feed, specifically sodium metabisulfite ("SMBS"), were together provided to the reactor over a 1 hour time period.

Regarding comparative formulation 1, the amount of each component at each stage was as follows:

Initial Rx charge: about 63 total parts water, about 0.03 total parts EDTA, and about 0.1 total parts DOWFAX™ 2A1, an anionic alkyldiphenyloxide disulfonate salt surfactant (Dow Chemical Company, Midland, Mich.);

Initiator feed: about 9.5 total parts water and about 0.25 total parts sodium persulfate;

Aqueous feed: about 40 total parts water, about 0.6 total parts DOWFAX™ 2A1, about 2.0 total parts acrylic acid, and about 1.5 total parts acrylamide;

Monomer feed: about 31.5 total parts MMA, about 20.0 total parts 2-EHA, and about 45 pts VeoVa-10;

Neutralization: about 1.2 total parts ammonium hydroxide 27%;

Oxidizer Feed: about 0.30 total parts TBHP; and

Reducer Feed: about 0.29 total parts SMBS.

Regarding comparative formulations 2 and 3, the amount of each component at each stage was as follows:

Initial Rx charge: about 63 total parts water, about 0.03 total parts EDTA, and about 0.1 total parts DOWFAX™ 2A1, an anionic alkyldiphenyloxide disulfonate salt surfactant (Dow Chemical Company, Midland, Mich.);

Initiator feed: about 9 total parts water and about 0.25 total parts sodium persulfate;

Aqueous feed: about 40 total parts water, about 0.6 total parts DOWFAX™ 2A1, about 2.0 total parts acrylic acid; and about 1. total 5 parts acrylamide;

Monomer feed: about 46.5 total parts MMA, about 50 total parts 2-EHA

Neutralization: about 1.2 total parts ammonium hydroxide 27%;

Oxidizer Feed: about 0.30 total parts TBHP; and

Reducer Feed: about 0.29 total parts SMBS.

Regarding comparative formulation 4 and 5, the amount of each component at each stage was as follows:

Initial Rx charge: about 63 total parts water, about 0.03 total parts EDTA, and about 0.1 total parts DOWFAX™ 2A1, an anionic alkyldiphenyloxide disulfonate salt surfactant (Dow Chemical Company, Midland, Mich.);

Initiator feed: about 9.0 total parts water and about 0.25 total parts sodium persulfate;

Aqueous feed: about 40 total parts water, about 0.6 total parts DOWFAX™ 2A1, about 1.5 total parts acrylic acid, and about 2 total parts acrylamide;

Monomer feed: about 45.5 total parts MMA, about 50 total parts 2-EHA, and about 1 total part vinyl triethoxysilane;

Neutralization: about 1.2 total parts ammonium hydroxide 27%;

Oxidizer Feed: about 0.30 total parts TBHP; and

Reducer Feed: about 0.29 total parts SMBS.

Regarding comparative formulation 6 and 7, the amount of each component at each stage was as follows:

Initial Rx charge: about 63 total parts water, about 0.03 total parts EDTA, and about 0.1 total parts DOWFAX™ 2A1, an anionic alkyldiphenyloxide disulfonate salt surfactant (Dow Chemical Company, Midland, Mich.);

Initiator feed: about 9 total parts water and about 0.25 total parts sodium persulfate;

Aqueous feed: about 40 total parts water, about 0.6 total parts DOWFAX™ 2A1, about 1.5 total parts acrylic acid, and about 2 total parts acrylamide;

Monomer feed: about 44.5 total parts MMA, about 50 total parts 2-EHA, and about 2 total parts vinyl triethoxysilane;

Neutralization: about 1.2 total parts ammonium hydroxide 27%;

Oxidizer Feed: about 0.30 total parts TBHP; and

Reducer Feed: about 0.29 total parts SMBS.

The formulations are as follows.

Comparative Formula 1: copolymer of 45 wt % VeoVa-10, 20 wt % 2-ethyl hexyl acrylate, 31.5 wt % methyl methacrylate, 1.5 wt % acrylamide, 2 wt % acrylic acid, and 0.6 wt % of a conventional, non-polymerizable surfactant, Dowfax 2A1.

Comparative Formulas 2 and 3: copolymer of 46.5 wt % methyl methacrylate, 50% 2-ethyl hexyl acrylate, 1.5% wt % acrylamide, 2 wt % acrylic acid, 0.6 wt % Dowfax 2A1.

Comparative Formulas 4 and 5: copolymer of 45.5 wt % methyl methacrylate, 50 wt % ethyl hexyl acrylate, 1.5 wt % acrylamide, 2 wt % acrylic acid, 1 wt % vinyl triethoxysilane, and 0.6 wt % Dowfax 2A1.

Comparative Formulas 6 and 7: copolymer of 44.5 wt % methyl methacrylate, 50 wt % ethyl hexyl acrylate, 1.5 wt % acrylamide, 2 wt % acrylic acid, 2 wt % vinyl triethoxysilane, and 0.6 wt. % Dowfax 2A1.

Example 2

Formulations according to the invention were made according to same procedure described in Example 1, with the following amounts of ingredients for both formulations 8 and 9 at each stage:

Initial Rx charge: about 65 total parts water, about 0.03 total parts EDTA, and about 0.35 total parts ADEKA REASOAP SR-10;

Initiator feed: about 9.5 total parts water and about 0.25 total parts sodium persulfate;

Aqueous feed: about 40 total parts water, about 2.95 total parts ADEKA REASOAP SR-10, and about 1.5 total parts acrylic acid;

Monomer feed: about 35.2 total parts MMA, about 20 total parts 2-EHA, and about 40 total parts VeoVa™ 10;

Neutralization: about 1.2 total parts ammonium hydroxide 27%;

Oxidizer Feed: about 0.30 total parts TBHP; and

Reducer Feed: about 0.29 total parts SMBS.

The formulations are as follows:

Formulations 8 and 9: 40 wt % VeoVa-10, 20 wt. % ethyl hexyl acrylate, 1.5 wt % acrylic acid, 35.2 wt % methyl methacrylate, and 3.3% Adeka SR-10.

Example 3

Coating formulations 1-11 were made incorporating one of comparative formulations 1-7, formulations 8 and 9, or Dow NEOCAR 820 or ACRONAL NX 4787 as shown in tables 1 and 2 below.

TABLE 1

| Ingredient | Activity % | Dry PPH | Wet PPH |
|---|---|---|---|
| Pigment | | | |
| DF 50 Dispersant | 100 | 100.0 | 100.0 |
| Darvan 811 Dispersion | 40 | 0.15 | 0.38 |
| See Below Rheology Modifier | 44.3 | 7.0 | 15.80 |
| Latekoll D | 25 | 0.600 | 2.40 |
| Total | | 107.8 | 118.6 |

TABLE 2

| # | Dispersion | Activity % | Dry PPH | Wet PPH | Coat Wt. gsm | Total Wt. | Viscosity 6/100 cP | Coating Solids % w/w |
|---|---|---|---|---|---|---|---|---|
| 1 | Dow Neocar 820 | 44.3 | 7.0 | 15.80 | 250-300 | 336.1 | 4070 | 70.1 |
| 2 | AN NX 4787 | 49.9 | 7.0 | 14.03 | 250-300 | 332.1 | 2830 | 68.6 |
| 3 | Comp. Formula 1 | 44.9 | 7.0 | 15.59 | 250-300 | 335.6 | 3780 | 70.4 |
| 4 | Comp. Formula 2 | 45.9 | 7.0 | 15.25 | 250-300 | 334.8 | 3570 | 70.6 |
| 5 | Comp. Formula 3 | 45.5 | 7.0 | 15.38 | 250-300 | 335.1 | 3620 | 70.4 |
| 6 | Comp. Formula 4 | 45.9 | 7.0 | 15.25 | 250-300 | 334.8 | 3970 | 70.8 |
| 7 | Comp. Formula 5 | 45.7 | 7.0 | 15.32 | 250-300 | 335.0 | 3810 | 70.6 |
| 8 | Comp. Formula 6 | 44.5 | 7.0 | 15.73 | 250-300 | 335.9 | 3600 | 70.6 |
| 9 | Comp. Formula 7 | 44.8 | 7.0 | 15.63 | 250-300 | 335.7 | 4040 | 70.4 |
| 10 | Formula 8 | 45.7 | 7.0 | 15.32 | 250-300 | 335.0 | 4130 | 70.8 |
| 11 | Formula 9 | 44 | 7.0 | 15.91 | 250-300 | 336.3 | 3870 | 70.4 |

The viscosity of each of the coating formulations was measured (Brookfield Viscosity 6/100 cP), and external facer testing was conducted using the Gurley Air Permeance (double coated) and Cobb (double coated) tests. The results are as show in table 3 below.

TABLE 3

| | Sample ID | | |
|---|---|---|---|
| | Dow Neocar 820 | AN NX 4787 | Comp. Formula 1 |
| | Sample # | | |
| | 1 | 2 | 3 |
| Coating Solids % w/w | 70.1 | 68.6 | 70.4 |
| Brookfield Viscosity 6/100 cps | 4070 | 2830 | 3780 |
| Gurley Air Permeance Double Coated, s | 1400 | 1070 | 980 |
| Cobb Double Coated grams per sq. meter | 34.41 | 75.05 | 66.15 |
| | Sample ID | | |
| | Comp. Formula 2 | Comp. Formula 3 | Comp. Formula 4 |
| | Sample # | | |
| | 4 | 5 | 6 |
| Coating Solids % w/w | 70.6 | 70.4 | 70.8 |
| Brookfield Viscosity 6/100 cps | 3570 | 3620 | 3970 |
| Gurley Air Permeance Double Coated, s | 1260 | 1280 | 1470 |
| Cobb Double Coated grams per sq. meter | 71.93 | 71.56 | 66.34 |

TABLE 3-continued

| | Sample ID | | |
|---|---|---|---|
| | Comp. Formula 5 | Comp. Formula 6 | Comp. Formula 7 |
| | Sample # | | |
| | 7 | 8 | 9 |
| Coating Solids % w/w | 70.6 | 70.6 | 70.4 |
| Brookfield Viscosity 6/100 cps | 3810 | 3600 | 4040 |
| Gurley Air Permeance Double Coated, s | 1500 | 1580 | 1530 |
| Cobb Double Coated grams per sq. meter | 63.33 | 75.9 | 76.85 |

| | Sample ID | |
|---|---|---|
| | Formula 8 | Formula 9 |
| | Sample # | |
| | 10 | 11 |
| Coating Solids % w/w | 70.8 | 70.4 |
| Brookfield Viscosity 6/100 cps | 4130 | 3870 |
| Gurley Air Permeance Double Coated, s | 1330 | 1510 |
| Cobb Double Coated grams per sq. meter | 34.8 | 39.91 |

Example 4

Formulations 10-24 were prepared according to the procedure described in Example 1.

Example 5

Coating formulations 10-23 were made incorporating formula 8 or 9 from Table 2 or one of the formulations 12-26 as shown in the tables 4 and 5 below. DARVAN 811 is a sodium polyacrylate in an aqueous solution (R.T. Vanderbilt Company, Norwalk, Conn.). DF 50 is calcium carbonate from Franklin Industrial Minerals. LATEKOLL D is an aqueous dispersion of an acrylic copolymer (BASF, Florham Park, N.J.).

The formulations are as follows:

Formulas 10 and 11: copolymer of 45.5% MMA, 50% BA, and 4.5% acrylic acid, and made with Dowfax 2A1;

Formulas 12 and 13: copolymer of 45.5% MMA, 50% BA, 4.5% acrylic acid, and Adeka SR-10;

Formulas 14 and 15: copolymer of 45.5% styrene, 50% BA, and 4.5% acrylic acid, and made with Dowfax 2A1;

Formulas 16 and 17: copolymer of 45.5% styrene, 50% BA, 4.5% acrylic acid, and Adeka SR-10;

Formulas 18 and 19: copolymer of 60.5% styrene, 35% butadiene, and 4.5% acrylic acid, and made with Dowfax 2A1;

Formulas 20-22: copolymer of 60.5% styrene, 35% butadiene, 4.5% acrylic acid, and Adeka SR-10; and Formula 23: copolymer of 45.5% MMA, 50% BA, 4.5% acrylic acid, and Adeka SR-10.

TABLE 4

| Ingredient | Activity % | Dry PPH | Wet PPH |
|---|---|---|---|
| Pigment | | | |
| DF 50 | 100 | 100.0 | 100.0 |
| Dispersant | | | |
| Darvan 811 | 40 | 0.15 | 0.38 |
| Dispersion | | | |
| See Below | 44.3 | 7.0 | 15.80 |
| Rheology Modifier | | | |
| Latekoll D | 25 | 0.600 | 1.92 |
| Total | | 107.8 | 118.1 |

TABLE 5

| # | Dispersion | Activity % | Dry PPH | Wet PPH | Coat Wt. gsm | Total Wt. | 21° C. Viscosity 6/100 cP | Coating Solids % w/w |
|---|---|---|---|---|---|---|---|---|
| 12 | Formula 8 or 9 (Table 2) | 45.5 | 7.0 | 15.38 | 300 | 373.1 | 2260 | 70 |
| 13 | Formula 10 | 47.7 | 7.0 | 146.8 | 300 | 371.4 | 1740 | 70 |
| 14 | Formula 11 | 49.3 | 7.0 | 14.20 | 300 | 370.2 | 1810 | 70 |
| 15 | Formula 12 | 47.4 | 7.0 | 14.77 | 300 | 371.6 | 2220 | 70 |
| 16 | Formula 13 | 52.3 | 7.0 | 13.18 | 300 | 368.1 | 2900 | 70 |
| 17 | Formula 14 | 53.9 | 7.0 | 12.99 | 300 | 367.1 | 1500 | 70 |
| 18 | Formula 15 | 49.7 | 7.0 | 14.08 | 300 | 369.9 | 1680 | 70 |
| 19 | Formula 16 | 51.1 | 7.0 | 13.70 | 300 | 368.9 | 1880 | 70 |
| 20 | Formula 17 | 51 | 7.0 | 13.73 | 300 | 369.0 | 2020 | 70 |
| 21 | Formula 18 | 50.5 | 7.0 | 13.86 | 300 | 369.3 | 1780 | 70 |
| 22 | Formula 19 | 50.5 | 7.0 | 13.86 | 300 | 369.3 | 1620 | 70 |
| 23 | Formula 20 | 49.1 | 7.0 | 14.26 | 300 | 370.3 | 1880 | 70 |
| 24 | Formula 21 | 44.3 | 7.0 | 15.80 | 300 | 374.2 | 1770 | 70 |

TABLE 5-continued

| # | Dispersion | Activity % | Dry PPH | Wet PPH | Coat Wt. gsm | Total Wt. | 21° C. Viscosity 6/100 cP | Coating Solids % w/w |
|---|---|---|---|---|---|---|---|---|
| 25 | Formula 22 | 50.4 | 7.0 | 13.89 | 300 | 369.4 | 2040 | 70 |
| 26 | Formula 23 | 46.1 | 7.0 | 15.18 | 300 | 372.6 | 2320 | 70 |

The viscosity of each of the coating formulations was measured (Brookfield Viscosity 6/100, cP), and external facer testing was conducted using the Cobb (double coated) tests. The results are as shown in Table 6 below.

TABLE 6

| | Sample ID | | |
|---|---|---|---|
| | Formula 8 or 9 | Formula 10 | Formula 11 |
| | Sample # | | |
| | 10 | 11 | 12 |
| Coating Solids % w/w | 70 | 70 | 70 |
| Brookfield Viscosity 6/100 cP | 2260 | 1740 | 1810 |
| Cobb g/m² | 40.2 | 129.5 | 138.9 |
| Avg. Coat Weight g/m² | 310 | 302 | 317 |

| | Sample ID | | |
|---|---|---|---|
| | Formula 12 | Formula 13 | Formula 14 |
| | Sample # | | |
| | 13 | 14 | 15 |
| Coating Solids % w/w | 70 | 70 | 70 |
| Brookfield Viscosity 6/100 cP | 2220 | 2900 | 1500 |
| Cobb g/m² | 123.8 | 123.4 | 86.8 |
| Avg. Coat Weight g/m² | 319 | 329 | 308 |

| | Sample ID | | |
|---|---|---|---|
| | Formula 15 | Formula 16 | Formula 17 |
| | Sample # | | |
| | 16 | 17 | 18 |
| Coating Solids % w/w | 70 | 70 | 70 |
| Brookfield Viscosity 6/100 cP | 1680 | 1880 | 2020 |
| Cobb g/m² | 102.5 | 95.1 | 83.2 |
| Avg. Coat Weight g/m² | 298 | 307 | 308 |

| | Sample ID | | |
|---|---|---|---|
| | Formula 18 | Formula 19 | Formula 20 |
| | Sample # | | |
| | 19 | 20 | 21 |
| Coating Solids % w/w | 70 | 70 | 70 |
| Brookfield Viscosity 6/100 cP | 1780 | 1620 | 1880 |
| Cobb g/m² | 90.0 | 97.3 | 119.0 |
| Avg. Coat Weight g/m² | 275 | 293 | 299 |

| | Sample ID | | |
|---|---|---|---|
| | Formula 21 | Formula 22 | Formula 23 |
| | Sample # | | |
| | 22 | 23 | 24 |
| Coating Solids % w/w | 70 | 70 | 70 |
| Brookfield Viscosity 6/100 cP | 1770 | 2040 | 2320 |
| Cobb g/m² | 117.3 | 162.6 | 84.9 |
| Avg. Coat Weight g/m² | 299 | 308 | 310 |

While only certain representative combinations of the formulations, methods, or products disclosed herein are specifically described, other combinations of the method steps or combinations of elements of a composition or product are intended to fall within the scope of the appended claims. Thus a combination of steps, elements, or components may be explicitly mentioned herein; however, all other combination steps, elements, and components are included, even though not explicitly stated.

What is claimed is:

1. A binder or coating formulation, comprising a copolymer derived from:
    at least one vinyl ester of formula I:

$$CH_2=CR_1-O-CO-R_2, \qquad (I)$$

wherein $R_1$ is H or $CH_3$ and $R_2$ is $C_6$-$C_{12}$ branched or straight chain alkyl
    at least one copolymerizable surfactant of formula II, or salt thereof:

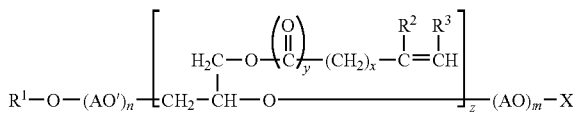

(II)

wherein $R^1$ represents a branched aliphatic hydrocarbon group, a secondary aliphatic hydrocarbon group or a branched aliphatic acyl group, AO and AO' each independently represent an oxyalkylene group having 2 to 4 carbon atoms, $R^2$ and $R^3$ each independently represent a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000; and
    optionally at least one additional co-monomer,
    wherein the binder or coating formulation is substantially free of surfactants not co-polymerized with the copolymer.

2. The binder or coating formulation according to claim 1, wherein the copolymer is derived from at least one additional co-monomer selected from the group consisting of styrene, butadiene, vinyl acetate, carboxylic acids, (meth)acrylic acid esters, (meth)acrylamide, and (meth)acrylonitrile.

3. The binder or coating formulation according to claim 2, wherein the copolymer is selected from the group consisting of pure acrylic-based copolymers, styrene acrylic-based copolymers, styrene butadiene-based copolymers, and vinyl acrylic-based copolymers.

4. The binder or coating formulation according to claim 2, wherein the copolymer is derived from pure acrylic-based copolymers.

5. The binder or coating formulation according to claim 4, wherein the at least one additional co-monomer is selected from the group consisting of (meth)acrylic acid, (meth) acrylic acid esters, (meth)acrylamide, (meth)acrylonitrile, and mixtures thereof.

6. The binder or coating formulation according to claim 4, wherein the at least one additional co-monomer includes methyl methacrylate, 2-ethyl hexyl acrylate, or mixtures thereof.

7. The binder or coating formulation according to claim 1, wherein the vinyl ester includes the vinyl ester of neodecanoic acid.

8. The binder or coating formulation according to claim 7, wherein the at least one additional co-monomer includes methyl methacrylate and 2-ethyl hexyl acrylate.

9. The binder or coating formulation according to claim 8, wherein the at least one additional co-monomer further includes acrylic acid.

10. The binder or coating formulation according to claim 2, wherein the copolymer is derived from:
    39 to 79% by weight of at least one (meth)acrylic acid ester;
    20 to 60% by weight of the at least one vinyl ester;
    0.5 to 5% by weight of the at least one copolymerizable surfactant;
    0.5 to 6% by weight of itaconic acid or a meth(acrylic) acid;
    0 to 3% by weight of at least one (meth)acrylamide;
    0 to 10% by weight of at least one (meth)acrylonitrile; and
    0 to 5% by weight of vinyl triethoxysilane.

11. The binder or coating formulation according to claim 1, wherein the copolymerizable surfactant is of formula IIa:

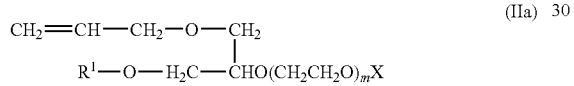

wherein $R^1$ is C9-C15 alkyl or C7-C11 alkyl-phenyl, X is H, $SO_3NH_4$ and/or $SO_3Na$, and m is from 3 to 50.

12. The binder or coating formulation according to claim 11, wherein $R^1$ is C10-C14 alkyl and m is from 5 to 25.

13. The binder or coating formulation according to claim 12, wherein the vinyl ester includes the vinyl ester of neodecanoic acid.

14. The binder or coating formulation according to claim 13, wherein the at least one additional co-monomer includes methyl methacrylate and 2-ethyl hexyl acrylate.

15. The binder or coating formulation according to claim 14, wherein the at least one additional co-monomer further includes acrylic acid.

16. The binder or coating formulation according to claim 1, wherein the copolymer is derived from 5 to 60 wt % of the vinyl ester of Formula I.

17. The binder or coating formulation according to claim 1, wherein the polymer has a median particle size of from 80 nm to 160 nm.

18. The binder or coating formulation according to claim 17, wherein the median particle size is from 90 nm to 150 nm.

19. The binder or coating formulation of claim 1, further comprising a dispersant.

20. The binder or coating formulation of claim 19, further comprising a pigment and a rheology modifier.

21. The binder or coating formulation according to claim 19, wherein the binder or coating formulation has a water absorptiveness using the Cobb test of less than 60 g/m².

22. A binder or coating formulation, comprising a copolymer derived from:
    at least one vinyl ester of formula I:

$$CH_2=CR_1—O—CO—R_2, \quad (I)$$

wherein $R_1$ is H or $CH_3$ and $R_2$ is $C_6$-$C_{12}$ branched or straight chain alkyl
    at least one copolymerizable surfactant of formula II, or salt thereof:

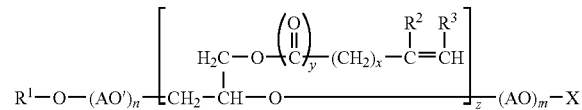

wherein $R^1$ represents a branched aliphatic hydrocarbon group, a secondary aliphatic hydrocarbon group or a branched aliphatic acyl group, AO and AO' each independently represent an oxyalkylene group having 2 to 4 carbon atoms, $R^2$ and $R^3$ each independently represent a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000; and
    optionally at least one additional co-monomer,
    wherein the formulation is free of surfactants other than the copolymerizable surfactant of formula II or a salt thereof.

23. A gypsum board, comprising:
    a gypsum core;
    a first glass scrim positioned on one side of the gypsum core;
    a second glass scrim positioned on an opposite side of the gypsum core;
    wherein at least one of the first glass scrim and the second glass scrim has a surface at least partially coated with a coating formulation comprising a copolymer derived from:
    at least one vinyl ester of formula I:

$$CH_2=CR_1—O—CO—R_2, \quad (I)$$

wherein $R_1$ is H or $CH_3$ and $R_2$ is $C_6$-$C_{12}$ branched or straight chain alkyl
    at least one copolymerizable surfactant of formula II, or salt thereof:

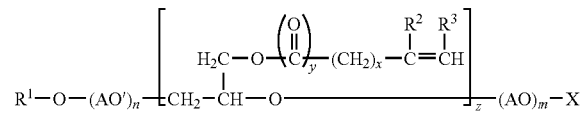

wherein $R^1$ represents a branched aliphatic hydrocarbon group, a secondary aliphatic hydrocarbon group or a branched aliphatic acyl group, AO and AO' each independently represent an oxyalkylene group having 2 to 4 carbon atoms, $R^2$ and $R^3$ each independently represent a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000; and
    optionally at least one additional co-monomer,
    wherein the coating formulation is substantially free of surfactants not copolymerized with the copolymer.

24. A gypsum board, comprising:

a gypsum core;

a first glass scrim positioned on one side of the gypsum core;

a second glass scrim positioned on an opposite side of the gypsum core;

wherein at least one of the first glass scrim and the second glass scrim has a surface at least partially coated with a coating formulation comprising a copolymer derived from:

at least one vinyl ester of formula I:

$$CH_2=CR_1-O-CO-R_2,\qquad(I)$$

wherein $R_1$ is H or $CH_3$ and $R_2$ is $C_6$-$C_{12}$ branched or straight chain alkyl at least one copolymerizable surfactant of formula II, or salt thereof:

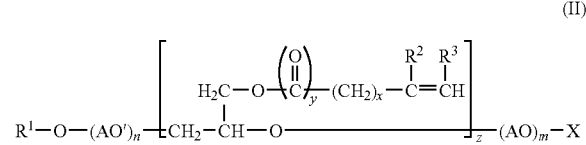

(II)

wherein $R^1$ represents a branched aliphatic hydrocarbon group, a secondary aliphatic hydrocarbon group or a branched aliphatic acyl group, AO and AO' each independently represent an oxyalkylene group having 2 to 4 carbon atoms, $R^2$ and $R^3$ each independently represent a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000; and optionally at least one additional co-monomer, wherein the formulation is free of surfactants other than the copolymerizable surfactant of formula II or a salt thereof.

25. A method of making a gypsum board, comprising:

coating at least a portion of a surface of a glass scrim with a polymer emulsion comprising a copolymer derived from at least one vinyl ester of formula I:

$$CH_2=CR_1-O-CO-R_2,\qquad(I)$$

wherein $R_1$ is H or $CH_3$ and $R_2$ is $C_6$-$C_{12}$ branched or straight chain alkyl at least one copolymerizable surfactant of formula II, or salt thereof:

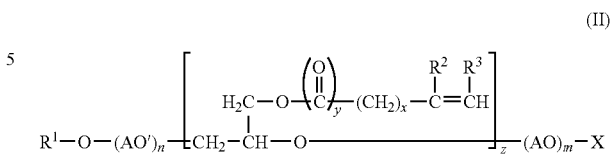

(II)

wherein $R^1$ represents a branched aliphatic hydrocarbon group, a secondary aliphatic hydrocarbon group or a branched aliphatic acyl group, AO and AO' each independently represent an oxyalkylene group having 2 to 4 carbon atoms, $R^2$ and $R^3$ each independently represent a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000; and optionally at least one additional co-monomer, wherein the polymer emulsion is substantially free of surfactants not copolymerized with the copolymer, laying the glass scrim on wet gypsum to attach the glass scrim to the gypsum to form a glass-gypsum composite; and drying the glass-gypsum composite or allowing the glass-gypsum composite to dry.

26. A method of making a copolymer, comprising reacting:

at least one vinyl ester of formula I:

$$CH_2=CR_1-O-CO-R_2,\qquad(I)$$

wherein $R_1$ is H or $CH_3$ and $R_2$ is $C_6$-$C_{12}$ branched or straight chain alkyl at least one copolymerizable surfactant of formula II, or salt thereof:

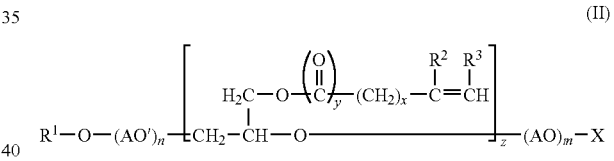

(II)

wherein $R^1$ represents a branched aliphatic hydrocarbon group, a secondary aliphatic hydrocarbon group or a branched aliphatic acyl group, AO and AO' each independently represent an oxyalkylene group having 2 to 4 carbon atoms, $R^2$ and $R^3$ each independently represent a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000; and optionally at least one additional co-monomer, wherein the copolymer is substantially free of surfactants not copolymerized with the copolymer.

* * * * *